United States Patent
Lee et al.

(10) Patent No.: US 9,767,033 B2
(45) Date of Patent: Sep. 19, 2017

(54) METHOD AND APPARATUS FOR MANAGING CACHE MEMORY IN COMMUNICATION SYSTEM

(71) Applicant: Samsung Electronics Co., Ltd., Suwon-si, Gyeonggi-do (KR)

(72) Inventors: Chul-Ki Lee, Seoul (KR); Sang-Jun Moon, Seoul (KR); Yong-Seok Park, Seoul (KR); Jung-Hwan Lim, Suwon-si (KR); Jiangwei Xu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/358,531

(22) PCT Filed: Nov. 15, 2012

(86) PCT No.: PCT/KR2012/009672
§ 371 (c)(1),
(2) Date: Jul. 31, 2014

(87) PCT Pub. No.: WO2013/073866
PCT Pub. Date: May 23, 2013

(65) Prior Publication Data
US 2014/0344525 A1    Nov. 20, 2014

(30) Foreign Application Priority Data
Nov. 15, 2011   (KR) .................. 10-2011-0118927

(51) Int. Cl.
*G06F 12/0891* (2016.01)
*G06F 12/0868* (2016.01)
(Continued)

(52) U.S. Cl.
CPC ...... *G06F 12/0891* (2013.01); *G06F 12/0868* (2013.01); *G06F 12/0888* (2013.01); *H04L 67/2842* (2013.01)

(58) Field of Classification Search
None
See application file for complete search history.

(56) References Cited

U.S. PATENT DOCUMENTS

2005/0060496 A1   3/2005  Krissell et al.
2005/0102300 A1   5/2005  Madsen
(Continued)

FOREIGN PATENT DOCUMENTS

KR   10-2002-0040794 A   5/2002
KR      10-0872227 B1    12/2008
(Continued)

OTHER PUBLICATIONS

Wang et al.; Cooperative proxy caching for wireless base stations; Journal Mobile Information Systems; Jan. 2007; pp. 1-18; vol. 3; Issue 1; IOS Press Amsterdam; The Netherlands, The Netherlands.

*Primary Examiner* — Midys Rojas
(74) *Attorney, Agent, or Firm* — Jefferson IP Law, LLP (57) ABSTRACT

In the present invention, a base station determines from a communication system whether a first content, which is requested by a mobile terminal, is saved on a cache memory, attributes a predetermined priority ranking to the first content and saves same on the cache memory when the first content is not saved on the cache memory, and updates the priority ranking of the first content on the basis of a predicted popularity of the first content, wherein the predicted popularity is decided on the basis of change in the number of views of a content that corresponds to a category of the first content.

12 Claims, 5 Drawing Sheets

(51) Int. Cl.
*G06F 12/0888* (2016.01)
*H04L 29/08* (2006.01)

(56) References Cited

U.S. PATENT DOCUMENTS

| | | | |
|---|---|---|---|
| 2009/0316715 | A1 | 12/2009 | Saniee |
| 2010/0274760 | A1 | 10/2010 | Diot et al. |
| 2010/0318484 | A1 | 12/2010 | Huberman et al. |
| 2014/0344525 | A1* | 11/2014 | Lee ................... H04L 67/2842 711/136 |
| 2016/0062903 | A1* | 3/2016 | Gao ...................... G06F 17/30 711/133 |

FOREIGN PATENT DOCUMENTS

| | | |
|---|---|---|
| KR | 10-2010-0095444 A | 8/2010 |
| KR | 10-2011-0050432 A | 5/2011 |

\* cited by examiner

METHOD AND APPARATUS FOR MANAGING CACHE MEMORY IN COMMUNICATION SYSTEM

TECHNICAL FIELD

The present disclosure relates to a method and apparatus for managing a cache memory in a communication system.

BACKGROUND ART

A cache replacement method indicates a method for deleting some information stored in a cache memory so as to fetch and store new data from a main memory because no desired information exists in the cache memory. In a related art, a least recently used (LRU) method and a least frequently used (LFU) method are used as the cache replacement method.

The LRU method is a method to delete the oldest information from the cache memory. In other words, the LRU method is a method to delete the least recently used information from the cache memory.

The LFU method is a method to delete the least used information from the cache memory. In other words, the LFU method is a method to delete the least frequently used information from the cache memory.

In the meantime, according to recent research, each content has its own life cycle. A life cycle of each content will be described in more detail with reference to FIG. 1.

Figure 1:
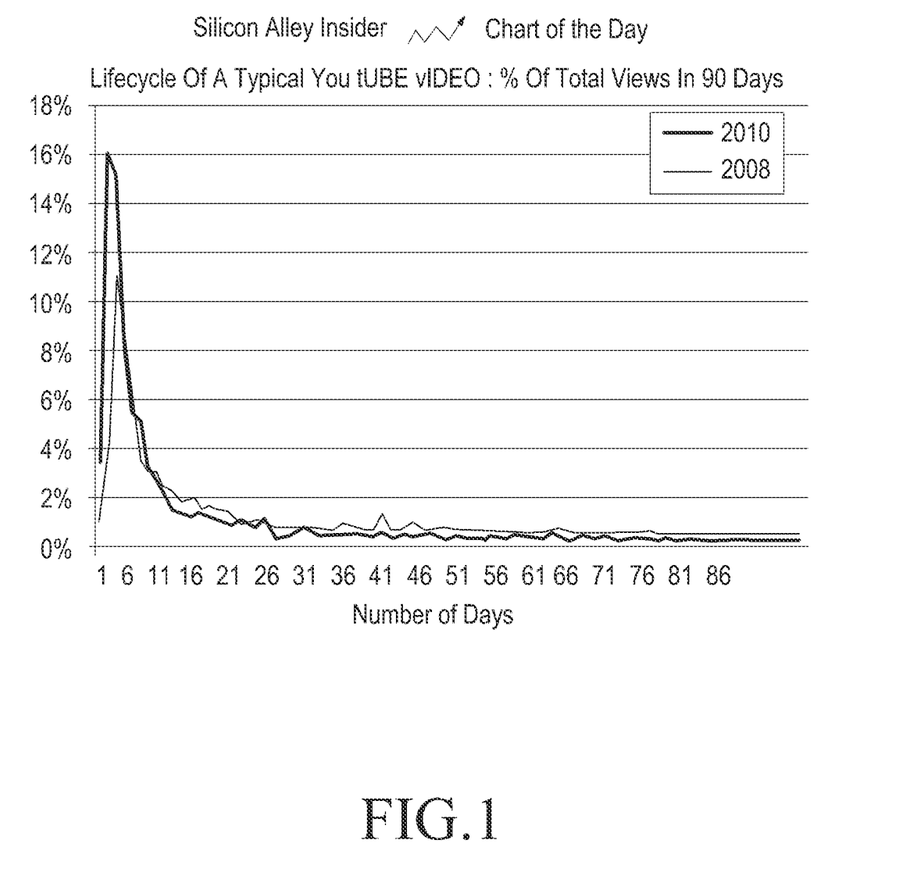
FIG. 1 illustrates a graph representing a life cycle of content of a related art.

FIG. 1 illustrates a graph representing a life cycle of content of a related art.

An example of a life cycle of Youtube video content for 90 days is illustrated in FIG. 1. Referring to FIG. 1, it may be seen that the number of views of the content increases at a breakneck speed for the first 1 to 5 days but since then it decreases in a form of a particular curve. As such, every content typically has its life cycle as shown in FIG. 1, and based on this, it is possible to predict future popularity of the content with the recent trend. However, in the related art, there has not been any cache replacement method that takes into account the life cycle of content and thus a problem arises that optimized cache replacement cannot be performed.

DISCLOSURE

Technical Problem

The present disclosure proposes a method and apparatus for managing a cache memory in a communication system.

The present disclosure also proposes a method and apparatus for managing a cache memory to increase cache memory hit ratio in a communication system.

The present disclosure also proposes a method and apparatus for managing a cache memory to efficiently perform cache replacement by taking into account a life cycle of content in a communication system.

Technical Solution

In accordance with an aspect of the present disclosure, a method for managing a cache memory of a base station (BS) in a communication system is provided. The method includes determining whether a first content requested by a mobile terminal is stored in the cache memory; storing the first content in the cache memory by placing a predetermined priority on the first content, if the first content is not stored in the cache memory; updating a priority of the first content based on expected popularity of the first content, wherein the expected popularity is determined based on a change in a number of views of a content corresponding to a category of the first content.

In accordance with another aspect of the present disclosure, a base station (BS) in a communication system is provided. The BS includes a receiver configured to receive a request for a first content from a mobile terminal; a cache memory; and a controller configured to determine whether the first content is stored in the cache memory upon reception of the request for the first content; store the first content in the cache memory by placing a predetermined priority on the first content, if the first content is not stored in the cache memory; and update a priority of the first content based on expected popularity of the first content, wherein the expected popularity is determined based on a change in a number of views of a content that corresponds to a category of the first content.

BEST MODE

Reference will now be made in detail to embodiments, examples of which are illustrated in the accompanying drawings, wherein like reference numerals refer to the like elements throughout. Detailed description of well-known functionalities and configurations will be omitted to avoid unnecessarily obscuring the present disclosure.

The present disclosure provides a method and apparatus for managing a cache memory in a communication system. Specifically, the present disclosure proposes a method and apparatus for enabling a base station (BS) of a communication system to use a cache memory to provide content to a user more quickly and to manage the cache memory more efficiently.

Before describing embodiments of the present disclosure, a general structure of a communication system for providing a content service will be discussed in connection with FIG. 2.

Figure 2:
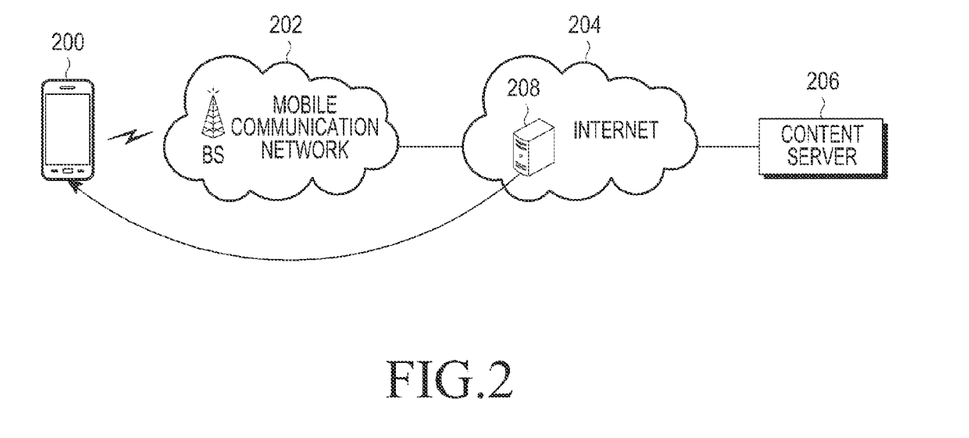
FIG. 2 illustrates a general communication system for providing a content service.

FIG. 2 illustrates a general communication system for providing a content service.

Referring to FIG. 2, in a general communication system, a mobile terminal 200 requests a content from a content server 206 over an Internet 204 separately from a mobile communication network 202, and receives the content provided from a content server 206 through e.g., a contents delivery network (CDN) server 208. Like this, such a content service is performed generally without consideration of the mobile communication network 202, and thus there is a problem that only a mobile terminal located nearest to the content server 206 may receive the content more quickly.

Accordingly, embodiments of the present disclosure proposes a method for providing a content service by taking into account a mobile communication network.

Figure 3:
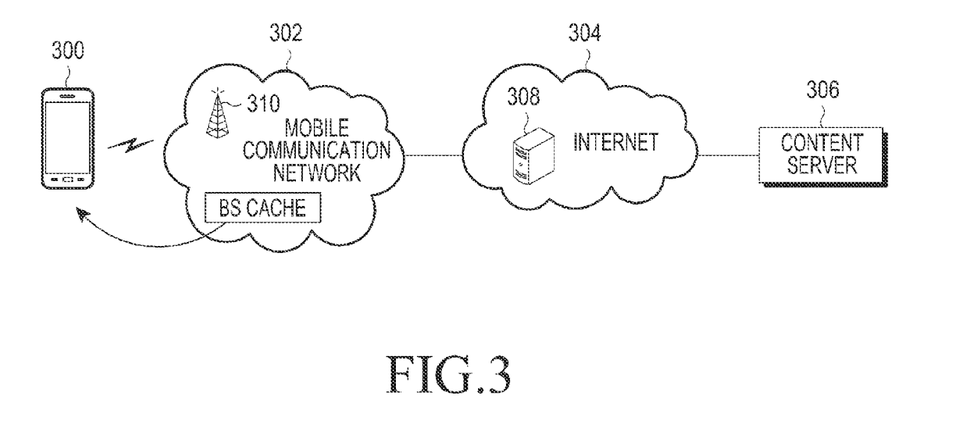
FIG. 3 illustrates a communication system for providing a content service, according to an embodiment of the present disclosure.

A system for providing a content service in accordance with embodiments of the present disclosure is shown in FIG. 3.

FIG. 3 illustrates a communication system for providing a content service, according to an embodiment of the present disclosure.

Referring to FIG. 3, a mobile terminal 300 is offered a content service through a mobile communication network 302 rather than an Internet 304. That is, the mobile terminal 300 sends a request for a content to a BS 310 and receives the content from the BS 310. For this, the BS 310 includes a cache memory to store multiple contents.

Like this, in the embodiment of the present disclosure, since a content service may be provided by taking into account mobility of the mobile terminal 300, the mobile terminal 300 conveniently obtains desired content more quickly by receiving the content service from a nearest BS.

In the meantime, the BS 310 needs to manage the cache memory efficiently to provide the desired content to the mobile terminal 300 more quickly. Accordingly, in an embodiment of the present disclosure, proposed is a method including calculating an expected popularity of content based on a life cycle of the content and enabling contents with high expected popularity to be stored among multiple contents.

In accordance with an embodiment of the present disclosure, the expected popularity may be calculated using expected number of views, rising momentum of the number of recent views, the number of recent views, etc. A method for calculating each of the expected number of views, rising momentum of the number of recent views and the number of recent views will now be described.

1. Expected Number of Views (1) Classification of Content Category

A BS first classifies categories based on URLs. For example, the BS classifies all the content having URLs in a form of 'Youtube/movie/xxx/yyy/zzz.flv' into a movie category.

(2) Management of Content Life Cycle per Category

The BS manages information regarding content life cycle per category. The BS manages the information regarding content life cycle by checking a change in the number of views of some of multiple contents day by day. The information regarding the content life cycle is represented as in Table 1

TABLE 1

| Day | Average Number of Views (Ni) |
|---|---|
| 1 | 10 |
| 2 | 30 |
| 3 | 60 |
| 4 | 150 |
| ... | ... |
| 30 | 5 |

Table 1 shows a content life cycle generated based on the average number of views for 30 days.

(3) Calculation of Content Hit Ratio

If particular content has been stored in the cache memory for more than a predetermined period of time, the BS calculates a ratio of the average content hits to the number of views of the content (Ratio_A) using Equation 1.

$$\text{Ratio\_A} = \text{the number of views of a particular content on } i^{th} \text{ day/the average number of views of content on } i^{th} \text{ day} \qquad \text{<Equation 1>}$$

(4) Calculation of the Expected Number of Views

As for the expected number of views, for example, if particular content has been stored in the cache memory for three days, the respective numbers of views of the particular content on the fourth day and fifth day are detected from the content life cycle of Table 1 for calculation of the expected number of views on the fifth day. The expected number of view is calculated by multiplying the detected number of views on the corresponding day by the content hit ratio (ratio_A) on the corresponding day and the expected number of views is calculated by combining all the results. It is expressed by Equation 2.

$$\text{Expected number\_of\_views} = \text{sum}(Ni * \text{ratio\_A}), (\text{days\_after\_first\_cache-entrance\_date} \leq i \leq i+n, n>0) \qquad \text{<Equation 2>}$$

In Equation 2, Ni represents the number of views on $i^{th}$ day.

2. Rising Momentum of the Number of Recent Views

The rising momentum of the number of recent views (hereinafter, referred to as 'rising momentum') is calculated using Equation 3 as follows:

$$\text{rising\_momentum} = (\text{the number of recent views for particular period of time}) - (\text{the number of views for the past same period}) \qquad \text{<Equation 3>}$$

For example, rising momentum of movie A content may be calculated as a difference (e.g., 150) between the number of views (e.g., 150) of the movie A content for days from October 10 to 14, 2011, and the number of views (e.g., 300) of the movie A content for days from October 3 to 7, 2011.

3. Number of Recent Views

The number of recent views represent an absolute value of the number of views of the corresponding content for a predetermined period of time. For example, the number of recent views may represent the number of views of the corresponding content viewed from the current date (October 14, 2011) back to a week ago (October 7, 2011).

Once the expected number of views, rising momentum and the number of recent views are calculated as described above, the BS calculates expected popularity using Equation 4 as follows:

$$\text{expected\_popularity} = W1*(\text{the expected number of views}) + W2*\text{rising\_momentum} + W3*(\text{the number of recent views}) \qquad \text{<Equation 4>}$$

In Equation 4, W1, W2 and W3 represent weights. If the BS places the highest weight on the expected number of views in calculating the expected popularity, W1 has a larger value than those of W2 and W3. If the BS places the highest weight on the rising momentum in calculating the expected popularity, W2 has a larger value than those of W1 and W3. Furthermore, if the BS places the highest weight on the number of recent views in calculating the expected popularity, W3 has a larger value than those of W1 and W2.

Once the expected popularity is calculated, the BS creates a popular content list using the expected popularity. The BS creates the popular content list having a predetermined number of contents among multiple contents per category, according to the magnitude of the expected popularity. The popular content list may be represented as shown in Table 1 as an example. Table 2 shows a popular content list under a movie category, as an example.

TABLE 2

| Index | Content Name | Expected Popularity |
|---|---|---|
| 1 | Movie A | 1 |
| 2 | Movie B | 0.8 |
| ... | ... | |
| 10 | Movie E | 0.5 |

A method for managing a cache memory in a BS using the expected popularity of requested content and the popular content list will now be described in more detail.

Figure 4:
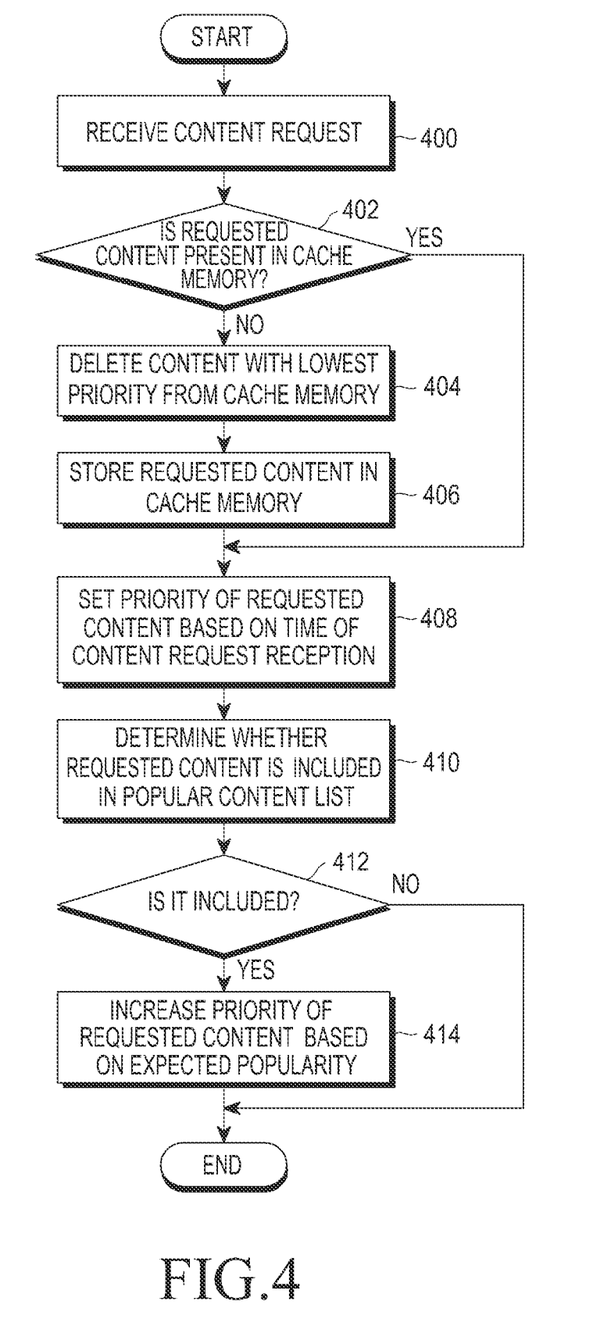
FIG. 4 is a flowchart of a procedure of managing a cache memory in a base station (BS) of a communication system, according to an embodiment of the present invention.

FIG. 4 is a flowchart of a procedure of managing a cache memory in a BS of a communication system, according to an embodiment of the present invention. In FIG. 4, as an example, a method for managing a cache memory based on a content request time will be described.

Referring to FIG. 4, in operation 400, a BS receives a request for content from a mobile terminal. In operation 402, the BS determines whether the requested content exists in the cache memory. If the requested content does not exist in the cache memory, the BS proceeds to operation 404 to delete a content having the lowest priority in the cache memory.

In the embodiment of FIG. 4, since priorities of respective contents stored in the cache memory are set based on the time at which the content is requested by the mobile terminal, a content having the oldest request time at which the content was requested by the mobile terminal is deleted among contents stored in the cache memory. As an example, in a case request times per content are stored in the cache memory as in the following Table 3, the BS deletes "movie C" content that has the oldest request time from the cache memory.

TABLE 3

| Content | Request Time | Priority |
|---|---|---|
| Movie A | Oct. 8, 2011, 02:00 p.m. | 2 |
| Movie B | Sep. 27, 2011, 09:00 a.m. | 3 |
| Movie C | Jul. 15, 2011, 08:00 p.m. | 4 |
| Movie D | Oct. 10, 2011, 07:30 p.m. | 1 |

In operation 406, the BS stores the requested content at the position where the content with the lowest priority was deleted in the cache memory, and in operation 408, sets up a priority of the requested content based on the reception time of the content request. For example, if the requested content is "movie E" content, the "movie E" content is stored at the position where the "movie C" content was deleted, as shown in the following Table 4.

Furthermore, to manage priorities per content in the cache memory, the mobile terminal stores the time at which the "movie E" content was requested by the mobile terminal (e.g., October 15, 2011, 02:00 p.m.). Then, the priorities per content stored in the cache memory are re-established as shown in Table 4, and the most recently requested "movie E" content has the highest priority.

TABLE 4

| Content | Request Time | Priority |
|---|---|---|
| Movie A | Oct. 8, 2011, 02:00 p.m. | 3 |
| Movie B | Sep. 27, 2011, 09:00 a.m. | 4 |

TABLE 4-continued

| Content | Request Time | Priority |
|---|---|---|
| Movie E | Oct. 15, 2011, 02:00 p.m. | 1 |
| Movie D | Oct. 10, 2011, 07:30 p.m. | 2 |

In the meantime, in operation 410, the BS determines whether the requested content is included in the popular content list. The popular content list represents a content list generated based on the expected popularity as previously discussed in connection with Table 2.

If it is determined that the requested content is included in the popular content list in operation 412, the BS increases the priority of the requested content based on the expected popularity of the requested content in operation 414. For example, if the requested content, i.e., the "movie E" content has the expected popularity of 0.5, the BS adds a time of 30 minutes that corresponds to the expected popularity to the requested time of the "move E" content. Since the "movie E" content is included in the popular content list, the BS adds additional 10 minutes to the requested time of the "movie E" content as a grace period. As a result, the requested time of the "movie E" content in Table 3 is set to be "02:40 p.m.".

In the meantime, if it is determined that the requested content exists in the cache memory in operation 402, the BS proceeds to operation 408 to set a priority of the requested content based on the reception time of the content request. This will be described in more detail as follows.

If the requested content is the "movie A" content, the BS checks the request time of the "movie A" content and updates a request time of the "movie A" content stored in the cache memory with the checked request time. For example, in case request times per content as shown in Table 3 are stored in the cache memory and the checked request time is "October 20, 2011, 6:00 p.m.", the request time of the "movie A" content is updated as shown in Table 5 and accordingly, all the priorities of entire movie contents are updated as well.

TABLE 5

| Content | Request Time | Priority |
|---|---|---|
| Movie A | Oct. 20, 2011, 06:00 p.m. | 1 |
| Movie B | Sep. 27, 2011, 09:00 a.m. | 3 |
| Movie C | Jul. 15, 2011, 08:00 p.m. | 4 |
| Movie D | Oct. 10, 2011, 07:30 p.m. | 2 |

Next, in operation 410, the BS determines whether the requested content is included in the popular content list. If the requested content is included in the popular content list in operation 412, the BS proceeds to operation 414 to increase the priority of the requested content based on the expected popularity.

For example, it is determined that the "movie A" content is included in the popular content list as shown in Table 2, the BS checks the expected popularity of the "movie A" content in the popular content list. The BS then updates the priority of the "movie A" content based on the checked expected popularity. In this regard, the BS updates the priority of the "movie A" content based on increasing time per expected popularity as shown in the following Table 6.

TABLE 6

| Expected Popularity | Increased Time |
| --- | --- |
| More than 1 | 72 hours |
| More than 0.5 less than 1 | 24 hours |
| More than 0.2 less than 0.5 | 1 hour |
| Less than 0.2 | 0 hour |

Since the expected popularity of the "movie A" content is 1, the BS determines an increasing time that corresponds to the expected popularity '1' in Table 6. The BS then updates the request time of the "movie A" content as much as the determined increasing time, i.e., 72 hours. Accordingly, the request time of the "movie A" content is updated from "October 20, 2011, 6:00 p.m." to "October 23, 2011, 6:00 p.m.", as shown in the following Table 7.

TABLE 7

| Content | Request Time | Priority |
| --- | --- | --- |
| Movie A | Oct. 23, 2011, 06:00 p.m. | 1 |
| Movie B | Sep. 27, 2011, 09:00 a.m. | 3 |
| Movie C | Jul. 15, 2011, 08:00 p.m. | 4 |
| Movie D | Oct. 10, 2011, 07:30 p.m. | 2 |

In the embodiment of FIG. 4, the method for managing a cache memory based on content request time was described. However, in another embodiment of the present disclosure, a method for managing the cache memory based on the number of views of content rather than the content request time may be used as well. This will be described in more detail with reference to FIG. 5.

Figure 5:
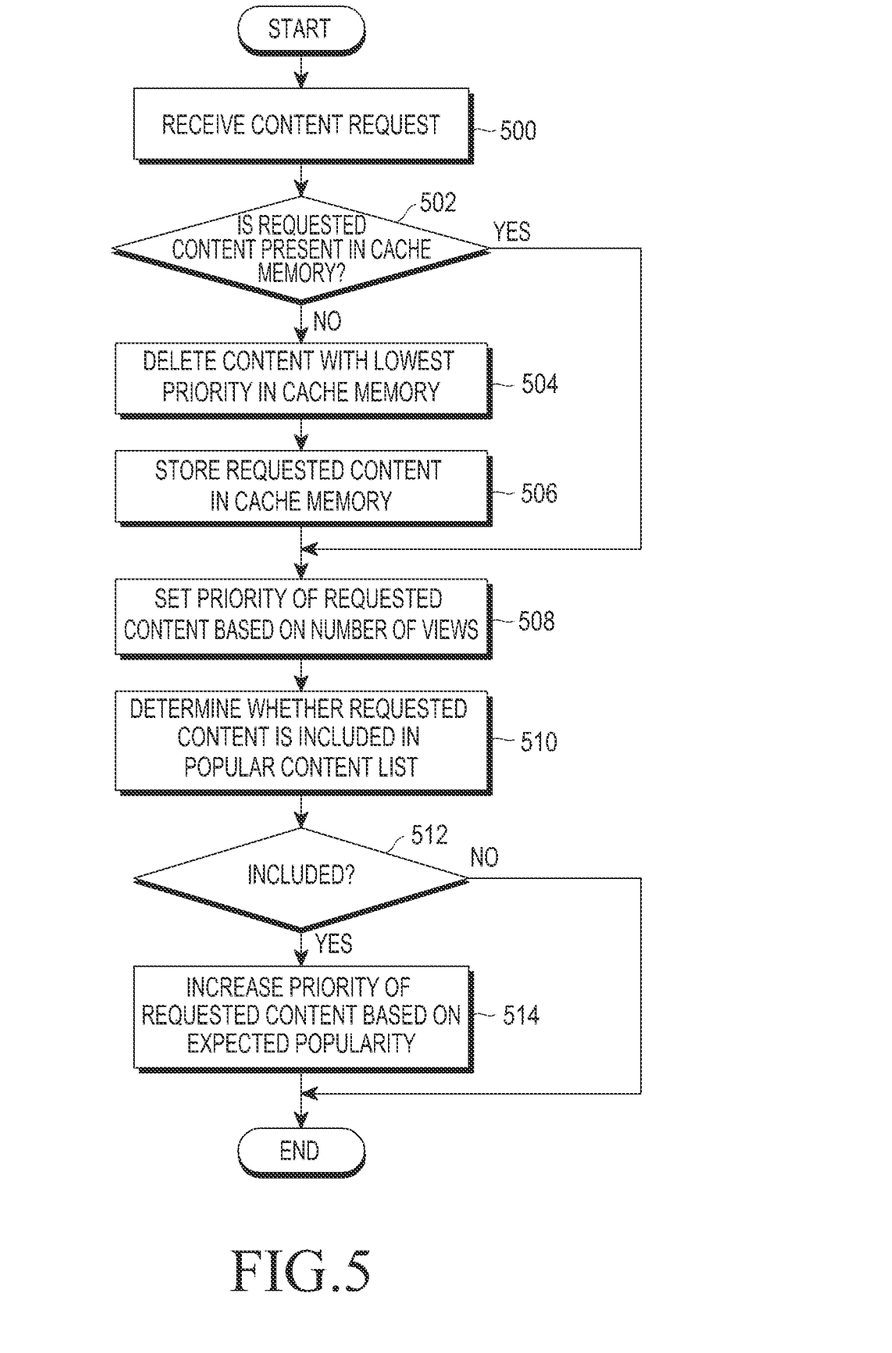
FIG. 5 is a flowchart of a procedure of managing a cache memory in a BS of a communication system, according to another embodiment of the present invention.

FIG. 5 is a flowchart of a procedure of managing a cache memory in a BS of a communication system, according to another embodiment of the present invention.

Referring to FIG. 5, in operation 500, a BS receives a request for content from a mobile terminal. In operation 502, the BS determines whether the requested content exists in the cache memory. If the requested content does not exist in the cache memory, the BS proceeds to operation 504 to delete a content having the lowest priority from the cache memory.

In the embodiment of FIG. 5, since priorities of respective contents stored in the cache memory are set based on the number of views for a predetermined period of time, a content that has the least number of views is deleted among contents stored in the cache memory. As an example, in a case that numbers-of-views per content are stored in the cache memory as in the following Table 8, the BS deletes "movie B" content that has the least number of views from the cache memory.

TABLE 8

| Content | Number of Views (for the recent week) | Priority |
| --- | --- | --- |
| Movie A | 150 | 1 |
| Movie B | 25 | 4 |
| Movie C | 84 | 3 |
| Movie D | 132 | 2 |

In operation 506, the BS stores the requested content at the position where the content with the lowest priority was deleted in the cache memory, and in operation 508, sets up a priority of the requested content based on the number of views. For example, if the requested content is "movie F" content, the "movie F" content is stored at the position where the "movie B" content has been deleted, as shown in the following Table 9.

Furthermore, to manage priorities per content in the cache memory, the mobile terminal stores the number of views of the "movie F" content as '0'. Then, the priorities per content stored in the cache memory is re-established as shown in Table 9, and the "movie F" content whose number of views is set as '0' has the lowest priority.

TABLE 9

| Content | Number of Views (for a recent week) | Priority |
| --- | --- | --- |
| Movie A | 150 | 1 |
| Movie F | 0 | 4 |
| Movie C | 54 | 3 |
| Movie D | 132 | 2 |

In the meantime, in operation 510, the BS determines whether the requested content is included in the popular content list. If it is determined that the requested content is included in the popular content list in operation 512, the BS increases the priority of the requested content based on the expected popularity of the requested content in operation 514. In this regard, the BS increases the priority of the requested content based on increased number of views per expected popularity as shown in the following Table 10.

TABLE 10

| Expected Popularity | Number of Increased Views |
| --- | --- |
| More than 1 | 100 |
| More than 0.5 less than 1 | 50 |
| More than 0.2 less than 0.5 | 10 |
| Less than 0.2 | 0 |

For example, if the requested content, i.e., "movie F" content has the expected popularity of 0.5, the BS adds the increased number of views, 50 that corresponds to the expected popularity to the number of views of the "move F" content. Then, the BS adds the additional number of views, 10 to the number of views of the "movie F" content based on the fact that the "movie F" content is included in the popular content list. Accordingly, the number of views of the "movie F" content is set as "60". Then, as the number of views of the "movie F" content is set as "60", as shown in the following Table 11, priorities change as well, as compared with Table 11.

TABLE 11

| Content | Number of Views (for a recent week) | Priority |
| --- | --- | --- |
| Movie A | 150 | 1 |
| Movie F | 60 | 3 |
| Movie C | 54 | 4 |
| Movie D | 132 | 2 |

In the meantime, if it is determined that the requested content exists in the cache memory in operation 502, the BS proceeds to operation 508 to set a priority of the requested content based on the number of views. For example, if the requested content is "movie D" content, the BS checks the number of views of the "movie D" content and updates the priority based on the checked number of views.

Next, in operation 510, the BS determines whether the requested content is included in the popular content list. If the requested content is included in the popular content list in operation 512, the BS proceeds to operation 514 to increase the priority of the requested content based on the expected popularity.

If the "movie D" content is included in the popular content list, the BS checks an expected popularity that corresponds to the "movie D" content in the popular content list. And, the BS increases the priority of the requested content based on the increased number of views that corresponds to the checked expected popularity as shown in the following Table 10.

As described above, in the embodiments of the present disclosure, the BS may manage a cache memory more efficiently by taking into account life cycles per content based on the content request time or the number of views of content. Accordingly, the mobile terminal may conveniently obtain content it has requested more quickly from the BS.

A configuration of a BS in accordance with embodiments of the present disclosure will now be described with reference to FIG. 6.

Figure 6:
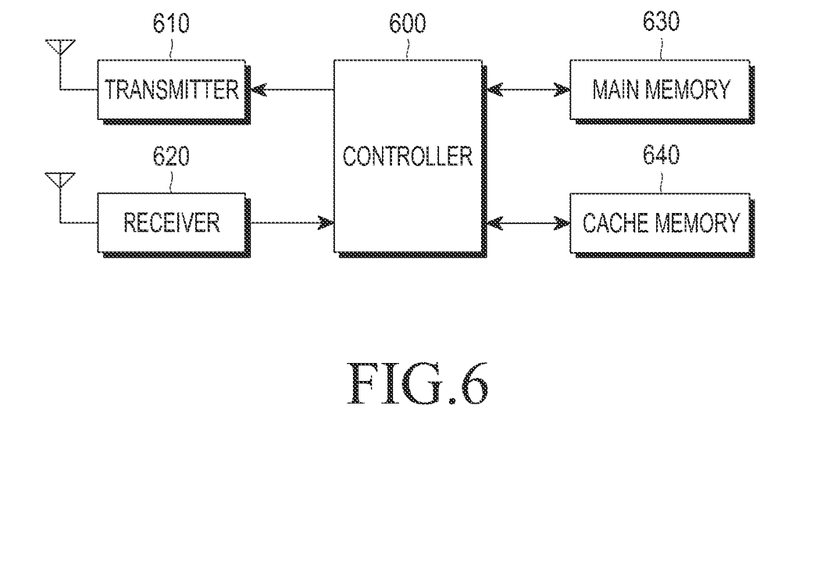
FIG. 6 is block diagram of a BS, according to an embodiment of the present disclosure.

FIG. 6 is block diagram of a BS, according to an embodiment of the present disclosure.

Referring to FIG. 6, the BS includes a controller 600, a transmitter 610, a receiver 620, a main memory 630, and a cache memory 640.

The controller 600 controls general operation of the BS by controlling the transmitter 610, the receiver 620, the main memory 630, and the memory 640. Especially, the controller 600 manages the cache memory 640 with a method proposed in the embodiments of the present disclosure as discussed above, to more efficiently provide content to a mobile terminal The transmitter 610 transmits a content requested by the mobile terminal to the mobile terminal, and the receiver 620 receives a content request from the mobile terminal. The main memory 630 stores different data and information used in the operating procedure of the BS, and the cache memory 640 stores frequently used information or a content to increase processing speed of the controller 600.

While in the embodiments of the present disclosure the BS calculates and uses an expected popularity, the expected popularity may be generated by a content server for providing a content and transmitted to the BS in other embodiments of the present disclosure. This will be described in more detail with reference to FIG. 7.

Figure 7:
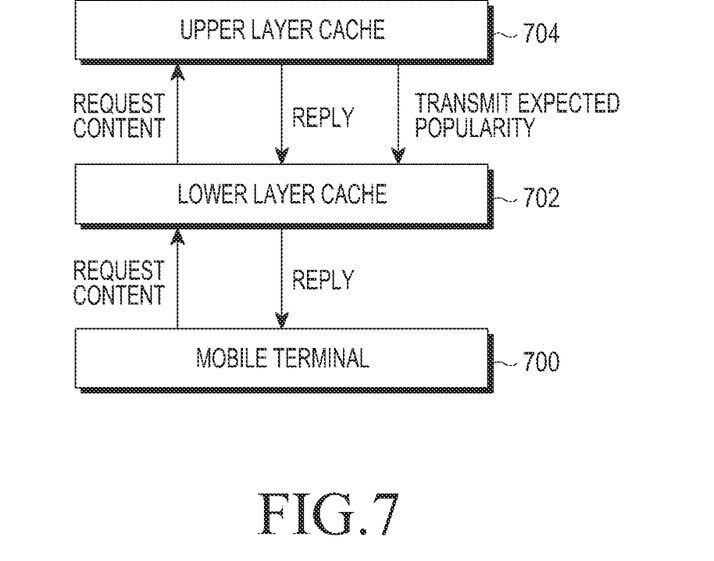
FIG. 7 illustrates a cache memory in a hierarchical structure in a communication system, according to an embodiment of the present disclosure.

FIG. 7 illustrates a cache memory in a hierarchical structure in a communication system, according to an embodiment of the present disclosure.

Referring to FIG. 7, the BS sends a request for content to the content server when a mobile terminal 700 requests the content. Then the content server sends the BS expected popularity information as a reply to the content request, together with the requested content stored in its cache memory (hereinafter, referred to as an 'upper layer cache') 704.

Upon reception of the content and the expected popularity information from the content server, the BS may store and mange the content and corresponding information in its cache memory (hereinafter, referred to as a 'lower layer cache') 702.

Since the content server may store more contents in the upper layer cache 704 than the BS may do, the content server may calculate the expected popularity more precisely and accordingly sort out content to be included in the popular content list.

For example, in an attempt to include 10 contents in the popular content list, sorting out 10 popular contents may be relatively precisely performed by the upper layer cache 704 as compared to the lower layer cache 702 since the lower layer cache 702 has less capacity to store content than that of the upper layer cache 704.

By enabling efficient cache replacement taking into account a life cycle of content, the present disclosure may have an effect of increasing cache memory hit ratio. Furthermore, the present disclosure has an advantage that a user may be offered corresponding content more quickly as a base station uses a cache memory. Accordingly, in the present disclosure, throughput of a communication system increases and the user may conveniently use desired content more easily.

Several embodiments have thus been described, but it will be understood that various modifications can be made without departing the scope of the present invention. Thus, it will be apparent to those ordinary skilled in the art that the embodiments of the present disclosure are not limited to the embodiments described, but can encompass not only the appended claims but the equivalents.

The invention claimed is:

1. A method for managing a cache memory of a base station (BS) in a communication system, the method comprising:
   determining whether a first content requested by a mobile terminal is stored in the cache memory;
   storing the first content in the cache memory by placing a predetermined priority on the first content, if the first content is not stored in the cache memory; and
   updating a priority of the first content based on expected popularity of the first content,
   wherein the expected popularity is determined based on a change in a number of views of a content corresponding to a category of the first content, and
   wherein the category of the first content is determined based on uniform resource locator (URL) information corresponding to the first content.

2. The method of claim 1, wherein the storing of the first content in the cache memory comprises:
   deleting a second content with a lowest priority from among multiple contents stored in the cache memory, and
   storing the first content in a position where the deleted second content was stored by placing the predetermined priority on the first content.

3. The method of claim 1,
   wherein the expected popularity is determined using at least one of a number of views of the first content for a first period of time, a difference between the number of views of the first content for the first period of time and a number of views of the first content for a second period of time, which is earlier than the first period of time, or an expected number of views of the first content after a time at which the first content is requested, and
   wherein the expected number of views is determined based on a change in the number of views of the content.

4. The method of claim 1, wherein the updating of the priority of the first content comprises:
   determining if the first content is included in a popular content list generated based on expected popularities of content per category, and increasing the priority of the first content by a value corresponding to an expected popularity of the first content, if the first content is included in the popular content list.

5. The method of claim 1, further comprising:
increasing the priority of the first content based on one of a request time of the first content or a number of views of the first content, if the first content is stored in the cache memory.

6. The method of claim 1, wherein the predetermined priority is determined based on one of a content request time and a number of views that is used to determine priorities of contents stored in the cache memory.

7. A base station (BS) in a communication system, the BS comprising:
a receiver configured to receive a request for a first content from a mobile terminal;
a cache memory; and
a controller configured to:
determine whether the first content is stored in the cache memory upon reception of the request for the first content,
store the first content in the cache memory by placing a predetermined priority on the first content, if the first content is not stored in the cache memory, and
update a priority of the first content based on expected popularity of the first content,
wherein the expected popularity is determined based on a change in a number of views of a content that corresponds to a category of the first content, and
wherein the category of the first content is determined based on uniform resource locator (URL) information corresponding to the first content.

8. The BS of claim 7, wherein the controller is further configured to:
delete a second content with a lowest priority from among multiple contents stored in the cache memory, and
store the first content in a position where the deleted second content was stored by placing the predetermined priority on the first content.

9. The BS of claim 7,
wherein the expected popularity is determined using at least one of a number of views of the first content for a first period of time, a difference between the number of views of the first content for the first period of time and a number of views of the first content for a second period of time, which is earlier than the first period of time, or an expected number of views of the first content after a time at which the first content is requested, and
wherein the expected number of views is determined based on a change in the number of views of content.

10. The BS of claim 7, wherein the controller is further configured to:
determine if the first content is included in a popular content list generated based on expected popularities of content per category, and
increase the priority of the first content by a value corresponding to an expected popularity of the first content, if the first content is included in the popular content list.

11. The BS of claim 7, wherein the controller is further configured to increase the priority of the first content based on one of a request time of the first content or a number of views of the first content, if the first content is stored in the cache memory.

12. The BS of claim 7, wherein the predetermined priority is determined based on one of a content request time or a number of views that is used to determine priorities of contents stored in the cache memory.

* * * * *